(12) United States Patent
Kashima

(10) Patent No.: US 6,317,529 B1
(45) Date of Patent: Nov. 13, 2001

(54) OPTICAL CROSS-CONNECT APPARATUS

(75) Inventor: Masayuki Kashima, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/453,202

(22) Filed: Dec. 3, 1999

(30) Foreign Application Priority Data

Dec. 8, 1998 (JP) .................................................. 10-348862

(51) Int. Cl.[7] ...................................................... G02B 6/28

(52) U.S. Cl. .............................. 385/16; 385/17; 385/24; 359/128

(58) Field of Search ................... 385/15–17, 24; 359/115, 117, 124, 127, 128

(56) References Cited

U.S. PATENT DOCUMENTS 6,115,517 * 9/2000 Shiragaki et al. ..................... 385/24

OTHER PUBLICATIONS

Nakajima et al. "Prototype WP–Based Optical Path Cross–Connect System Using PIU–LOSS Switches," Technical Report of IEICE, OCS98–29 (Jul. 23, 1998) pp. 13–18.

* cited by examiner

Primary Examiner—James Phan
(74) Attorney, Agent, or Firm—Venable; Robert J. Frank

(57) ABSTRACT

An optical cross-connect apparatus accepts a wavelength-division M-multiplexed optical signal (M is an integer). The apparatus has N input ports and N (N is an integer) output ports. To each input port, a wavelength-division multiplexed optical signal is applied. The M-multiplexed optical signal is applied to an optical demultiplexer, where the multiplexed signal is demultiplexed. The apparatus has an MN×MN optical switch matrix. The switch matrix switches the demultiplexed optical signals and applies the optical signals to wavelength converters. The wavelength converters convert each wavelength of the inputted optical signals into a predetermined wavelength, and applies it to an optical multiplexer. At the optical multiplexer, the optical signals are multiplexed and thus outputted from the output ports. The optical switch matrix is constructed by a plurality of N×M size unit switches.

6 Claims, 14 Drawing Sheets

1 Optical Cross-Connect Apparatus

OPTICAL CROSS-CONNECT APPARATUS

FIELD OF THE INVENTION

The present invention relates to an apparatus for allocating a plurality of optical paths. The present invention further relates to an apparatus for switching a plurality of signals.

BACKGROUND OF THE INVENTION

Recently, more transmission capacity and higher transmission speed has been required for data transmission systems. For satisfying such requirements, using the optical WDM (Wavelength-Division Multiplexing) technique is suitable for such systems. An optical cross-connect apparatus is one key device for developing such a system.

However, a large-scale optical switch is needed for such optical cross-connect apparatus. For example, suppose that a number of input/output optical fibers as N, and a number of optical multiplexing on each input/output fiber as M, the required switch size becomes MN×MN. Here, MN is the value which carries out the multiplication of the number N of input/output optical fibers to number M of optical multiplexing on each input/output optical fiber.

Moreover, the switch in such an optical cross-connect apparatus should be switched rapidly in the case of system failure or line failure, so as to achieve a quick restoration.

For example, a LiNbO3 optical waveguide switch using the electro-optic effect can be used as such a switch in which high-speed operation is possible. Also, a glass optical waveguide switch using the thermal-optic effect can be used.

Typical conventional large-scale optical switches are constructed by connecting several stages of small-scale unit switches. For example, Nakajima et. al, "Prototype WP-Based Optical Path Cross-Connect System Using PI-LOSS Switches", Technical Report of IEICE, OCS98-29 (1998.7.23), discloses an optical cross-connect system using an 8×8 optical switch. The 8×8 optical switch in the cross-connect system has a plurality of unit switches.

The system described in the document demultiplexes the optical wavelength multiplexed signal on each transmission line. The system then inputs the demultiplexed optical signal into the unit switches of the 8×8 optical switch. Here, optical signals of the same wavelength from each transmission line are inputted to the same unit switch. The unit switch switches the inputted optical signal and then applies it to the wavelength multiplexer, which corresponds to an output transmission line. At the wavelength multiplexer, the inputted optical signals are multiplexed and then applied to the output optical fiber.

However, the optical switch concentrates the optical signals of the same wavelength into the same unit switch. As a result, the optical switch cannot convert the wavelength of an optical signal into a different wavelength. For example, an optical signal of the wavelength λ1 of the transmission line #1 can be converted to the optical signal of the wavelength λ1 of the transmission line #2. In contrast, an optical signal of the wavelength λ1 of the transmission line #1 cannot be converted to the optical signal of the wavelength λ2 of the transmission line #2. Moreover, the optical switch cannot output a plurality of optical signals of the same wavelength from different transmission lines into the same transmission line.

SUMMARY OF THE INVENTION

Accordingly, it is an object of the present invention to provide an optical cross-connect apparatus with low signal loss. It is the other object of the present invention to provide an optical cross-connect apparatus which outputs optical wavelength division multiplexed signals to the desired port without blocking.

According to an aspect of the present invention, an optical cross-connect apparatus accepts a wavelength-division M-multiplexed optical signal (M is an integer). The apparatus has N input ports and N (N is an integer) output ports. To each input port, a wavelength-division multiplexed optical signal is applied. The M-multiplexed optical signal is applied to an optical demultiplexer, where the multiplexed signal is demultiplexed. The apparatus has an MN×MN optical switch matrix. The switch matrix switches the demultiplexed optical signals and applies the optical signals to wavelength converters. The wavelength converters converts the wavelength of each inputted optical signal into a predetermined wavelength, and applies it to an optical multiplexer. At the optical multiplexer, the optical signals are multiplexed and thus outputted from the output ports. Preferably, the optical switch matrix is constructed by a plurality of N×M size unit switches.

DESCRIPTION OF THE PREFERRED EMBODIMENT

Embodiments of the present invention will now be described with reference to the attached drawings.

Typically, as explained above, an optical cross-connect apparatus has an MN×MN optical switch. In such an optical switch, a plurality of N×M size of unit switches are used. Here, N is a number of input/output optical fibers, while M is a number of optical multiplexings performed on each input/output optical fiber.

Hereinbelow, for the simplification of the description, the optical switch of the embodiment is assumed to have three input/output optical fibers, and the number of optical multiplexings on each input/output optical fiber is also three. Thus, the switch scale of the optical switch becomes 9×9, and the switch scale of each unit switch becomes 3×3.

Figure 1:
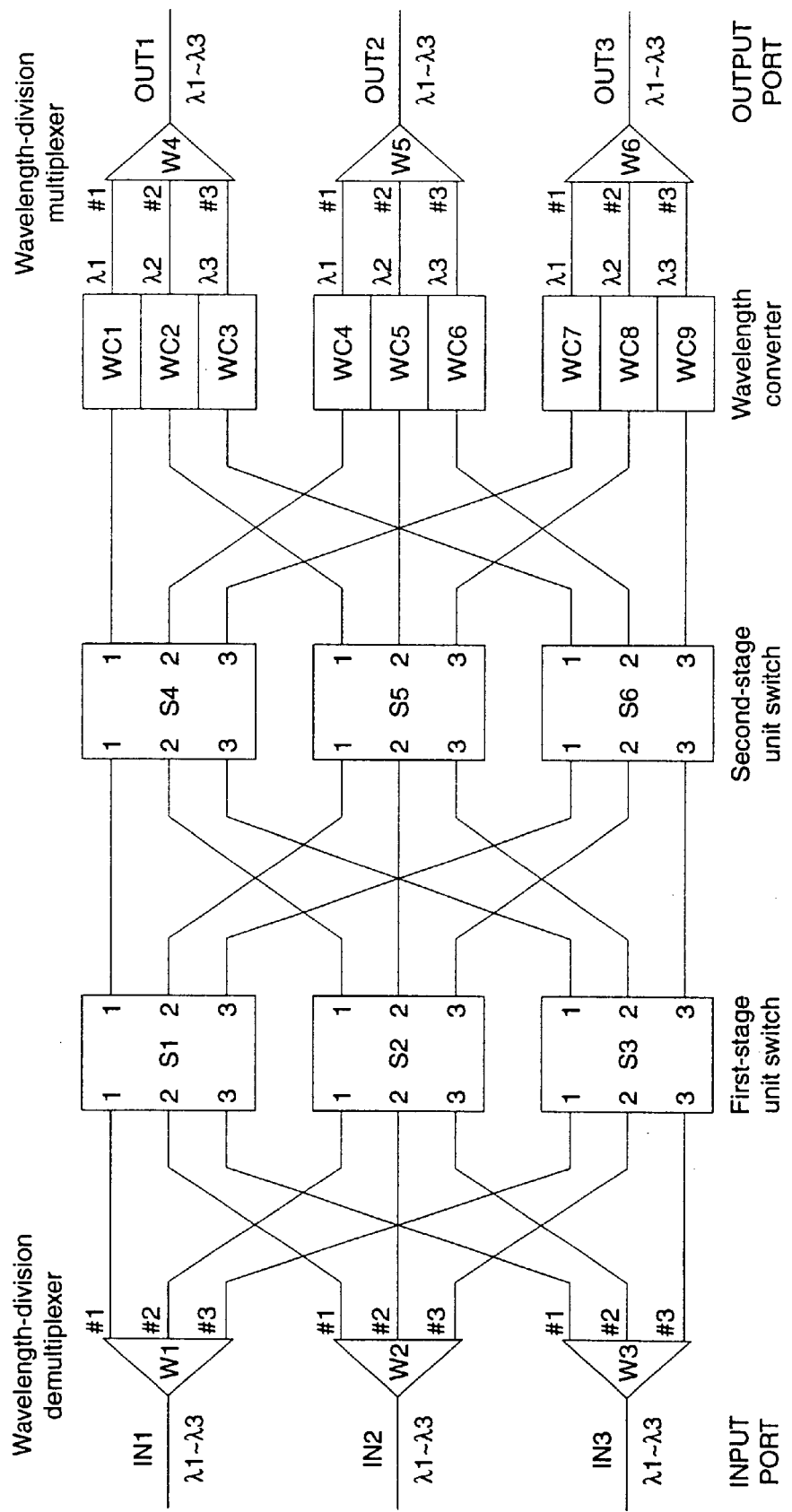
FIG. 1 is a functional block diagram showing the first embodiment of the present invention.

FIG. 1 is a block diagram of the optical cross-connect apparatus of the present invention. In FIG. 1, the optical cross-connect apparatus 1 has three input ports IN1, IN2, and IN3. Further, the optical cross-connect apparatus 1 has three output ports OUT1, OUT2, and OUT3.

To each of the input ports, an input optical fiber is connected. An optical wavelength division multiplexed signal is introduced into each of the input ports from the input optical fiber. Here, as mentioned above, the number of optical multiplexings on each optical fiber is three. Namely, optical signals with wavelengths λ1, λ2, and λ3 are multiplexed on each input optical fiber.

Further, to input ports IN1 to IN3, wavelength division demultiplexers W1, W2, and W3 are respectively coupled. Each of the wavelength division demultiplexers W1 W2, and W3 demultiplexs inputted optical multiplexed signals. These wavelength division demultiplexers can be formed with an optical coupler, an AWG (Arrayed Waveguide Grating) or an FBG (Fiber Bragg Grating).

To the output sides of the wavelength division demultiplexers W1, W2, and W3, the first-stage unit switches S1, S2, and S3 are coupled. The unit switch S1 is coupled to the wavelength division demultiplexer W1. The unit switch S2 is coupled to the wavelength division demultiplexer W2. And the unit switch S3 is coupled to the wavelength division demultiplexer W3.

To the output side of the first-stage unit switches S1, S2, and S3, the second-stage unit switches S4, S5, and S6 are coupled, respectively. The unit switch S4 is coupled to the unit switch S1. The unit switch S5 is coupled to the unit switch S2. And the unit switch S6 is coupled to the unit switch S3.

Accordingly, the first-stage unit switches and the second-stage unit switches constitute 9×9 optical switch.

The wavelength converters WC1 to WC9 are coupled to the output sides of the second stage unit switches S4, S5, and S6, respectively. The wavelength converters WC1 to WC3 are coupled to the second stage unit switch S4. The wavelength converters WC4 to WC6 are coupled to the second stage unit switch S5. And the wavelength converter WC7 to WC9 are coupled to the second stage unit switch S6.

The wavelength converters WC1 to WC9 convert the wavelengths of the optical signals into predetermined wavelengths. With these wavelength converters WC1 to WC9, the wavelengths each of the optical signals applied to the output ports OUT1 to OUT3 have three waves of λ1 to λ3. For this reason, the wavelength converters WC1, WC4, and WC7 change the wavelengths of the inputted optical signals into λ1. Similarly, the wavelength converters WC2, WC5, and WC8 changes the wavelengths of inputted optical signals into λ2, and the wavelength converters WC3, WC6, and WC9 change the wavelengths of the inputted optical signals into λ3.

The wavelength division multiplexer W4 is coupled to the wavelength converters WC1 to WC3. The wavelength division multiplexer W5 is coupled to the wavelength converters WC4 to WC6. And the wavelength division multiplexer W6 is coupled to the wavelength converters WC7 to WC9.

The output of the wavelength division multiplexers W4, W5, and W6 are respectively coupled to the output ports OUT1, OUT2, and OUT3. To each of the output ports, an output optical fiber is respectively connected. The number of optical multiplexing on each output optical fiber is also three. As a result, as mentioned above, signals with wavelength λ1, λ2, and λ3 are multiplexed on each optical fiber.

Next, the detailed connection between each part will be explained. Each of the wavelength division demultiplexers W1 to W3 demultiplexs the inputted optical wavelength multiplexed signal. As a result, the multiplexed signals of wavelength λ1 to λ3 are separated. These separated signals of λ1 to λ3 are outputted from the wavelength division demultiplexers W1 to W3. For this reason, each wavelength division demultiplexer W1 to W3 has three outputs #1 to #3. Here, suppose that the signal of wavelength λ1 is outputted at #1, the signal of wavelength λ2 is at #2, and the signal of wavelength λ3 is at #3.

In the first embodiment, each output #1 of the wavelength division demultiplexers W1 to W3 is coupled to the first-stage unit switch S1. Here, the output #1 of the wavelength division demultiplexer W1 is coupled to the input #1 of the first-stage unit switch S1. The output #1 of the wavelength division demultiplexer W2 is coupled to the input #2 of the first-stage unit switch S1. Further, the output #1 of the wavelength division demultiplexer W3 is coupled to the input #3 of the first-stage unit switch S1.

Similarly, each output #2 of the wavelength division demultiplexers W1 to W3 is coupled to the first-stage unit switch S2. Here, the output #2 of the wavelength division demultiplexer W1 is coupled to the input #1 of the first-stage unit switch S2. The output #2 of the wavelength division demultiplexer W2 is coupled to the input #2 of the first-stage unit switch S2. The output #2 of the wavelength division demultiplexer W3 is coupled to the input #3 of the first-stage unit switch S2.

Further, each output #3 of the wavelength division demultiplexers W1 to W3 is coupled to the first-stage unit switch S3. Here, the output #3 of the wavelength division demultiplexer W1 is coupled to the input #1 of the first-stage unit switch S3. The output #3 of the wavelength division demultiplexer W2 is coupled to the input #2 of the first-stage unit switch S2. The output #3 of the wavelength division demultiplexer W3 is coupled to the input #3 of the first-stage unit switch S3.

Each output #1 of the first-stage unit switches S1 to S3 is coupled to the second-stage unit switch S4. Here, the output #1 of the first-stage unit switch S1 is coupled to the input #1 of the second-stage unit switch S4. The output #1 of the first-stage unit switch S2 is coupled to the input #2 of the second-stage unit switch S4. Further, the output #1 of the first-stage unit switch S3 is coupled to the input #3 of the second-stage unit switch S4.

Similarly, each output #2 of the first-stage unit switches S1 to S3 is coupled to the second-stage unit switch S5. Here, the output #2 of the first-stage unit switch S1 is coupled to the input #1 of the second-stage unit switch S5. The output #2 of the first-stage unit switch S2 is coupled to the input #2 of the second-stage unit switch S5,. The output #2 of the first-stage unit switch S3 is coupled to the input #3 of the second-stage unit switch S5.

Further, each output #3 of the first-stage unit switches S1 to S3 is coupled to the second-stage unit switch S6. Here, the output #3 of the first-stage unit switch S1 is coupled to the input #1 of the second-stage unit switch S6. The output #3 of the first-stage unit switch S2 is coupled to the input #2 of the second-stage unit switch S6. The output #3 of the first stage unit switch S3 is coupled to the input #3 of the second-stage unit switch S6.

The second-stage unit switches S4 to S6 and the wavelength converters WC1 to WC9 are coupled as follows. The output #1 of the second-stage unit switch S4 is coupled to the wavelength converter WC1. The output #2 of the second-stage unit switch S4 is coupled to the wavelength converter WC4. And the output #3 of the second-stage unit switch S4 is coupled to the wavelength converter WC7.

Similarly, the output #1 of the second-stage unit switch S5 is coupled to the wavelength converter WC2. The output #2 of the second-stage unit switch S5 is coupled to the wavelength converter WC5. And the output #3 of the second-stage unit switch S5 is coupled to the wavelength converter WC8.

Further, the output #1 of the second-stage unit switch S6 is coupled to the wavelength converter WC3. The output #2 of the second-stage unit switch S6 is coupled to the wavelength converter WC6. And the output #3 of the second-stage unit switch S6 is coupled to the wavelength converter WC9.

Finally, the outputs of the wavelength converters WC1 to WC3 are coupled to the output port OUT1. The outputs of the wavelength converters WC4 to WC6 are coupled to the output port OUT2. The outputs of the wavelength converters WC7 to WC9 are coupled to the output port OUT3.

Next, the switching operation of the first embodiment will be explained. Hereinafter, six cases of the switching operation will be explained.

(A) The Optical Wavelength Multiplexed Signals are Applied to All Input Ports

Figure 2:
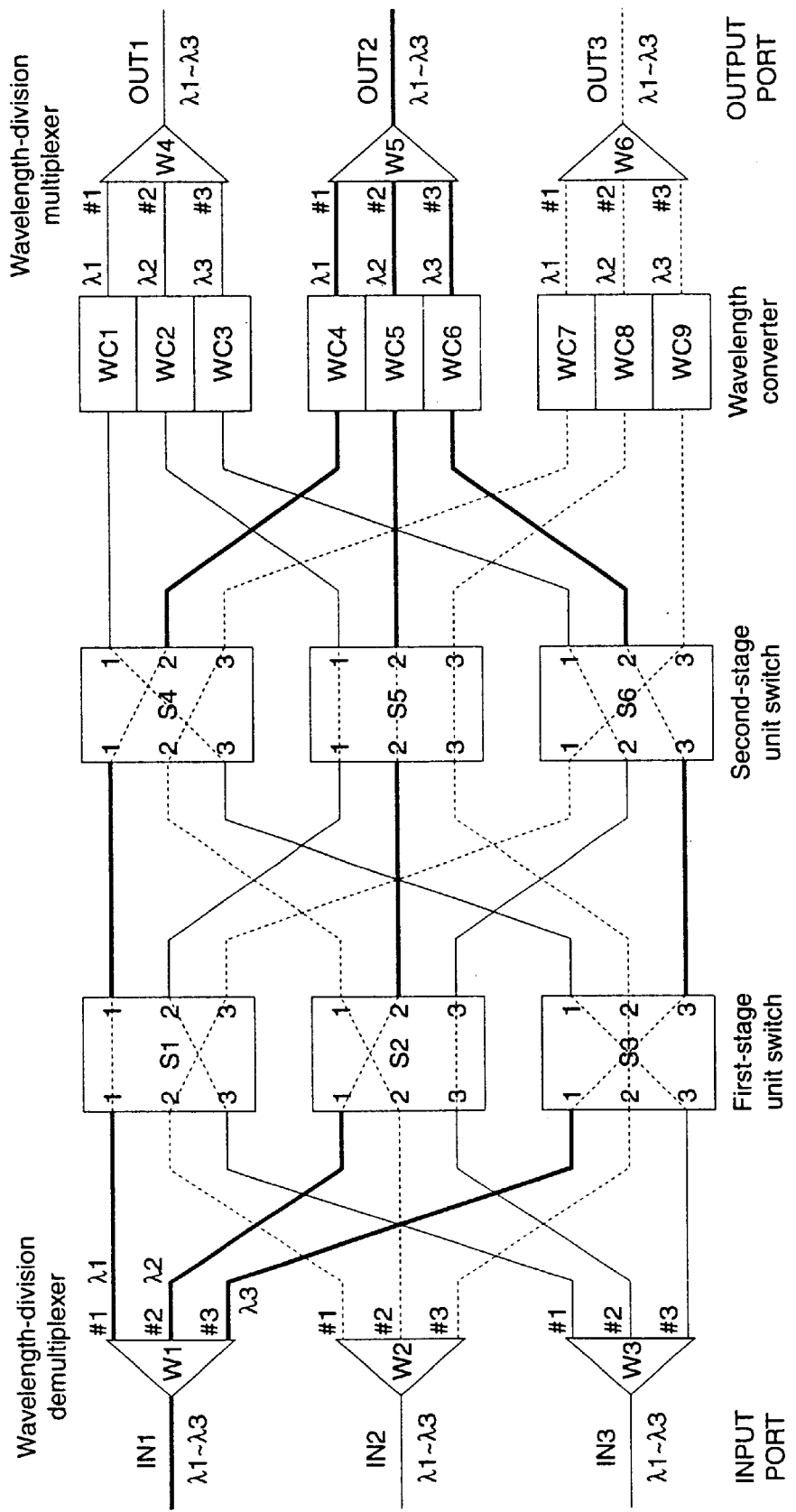
FIG. 2 shows an example for connection of each unit switch.

CASE A: All Optical Signals Inputted to the Same Input Port are Output from the Same Output Port FIG. 2 shows a connection each of the first and second-stage unit switches inside of the optical cross-connect 1. Here, the bold lines show the course of each optical signal inputted to the input port IN1. The dotted lines show the course of each optical signal inputted to the input port IN2. The normal lines show the course of each optical signal inputted to the input port IN3. In FIG. 2, all the optical signals inputted into the input port 1 are output from the output port OUT2. While all the optical signals inputted into the input port 2 are output from the output port OUT3, and all the optical signals inputted into the input port 3 are output from the output port OUT1. Such an output is achieved by switching the first-stage unit switches and the second-stage unit switches as follows.

Namely, input #1 and output #1, input #2 and output #3, and input #3 and output #2 of the first-stage unit switch S1 should be connected. Similarly, input #1 and output #2, input #2 and output #1, and input #3 and output #3 of the first-stage unit switch S2 should be connected. Further, input #1 and output #3, input #2 and output #2, and input #3 and output #1 of the first-stage unit switch S3 should be connected. Next, input #1 and output #2, input #2 and output #3, and input #3 and output #1 of the second-stage unit switch S4 should be connected. Similarly, input #1 and output #1, input #2 and output #2, and input #3 and output #3 of the second-stage unit switch S5 should be connected.

Finally, input #1 and output #3, input #2 and output #1, and input #3 and output #2 of the second-stage unit switch S6 should be connected.

In this case, for example, an optical signal output from the output #1 of the wavelength division demultiplexer W1 is led to the wavelength converter WC4. As explained above, the wavelength converter WC4 outputs an optical signal with the wavelength $\lambda 1$. Since the optical signal from the wavelength division demultiplexer W1 has the wavelength $\lambda 1$, the wavelength converter WC4 outputs the optical signal without changing the wavelength thereof.

However, for the other example, an optical signal output from the output #1 of the wavelength division demultiplexer W2 is led to the wavelength converter WC9. As explained above, the wavelength converter WC9 outputs an optical signal with the wavelength $\lambda 3$. Since the optical signal from the wavelength division demultiplexer W2 has the wavelength $\lambda 1$, the wavelength converter WC9 changes the wavelength thereof into $\lambda 3$ and outputs.

Of course, the connection explained above is an example. In the above example, input port 1 is coupled to the output port OUT2, input port 2 is coupled to the output port OUT3, and input port 3 is coupled to the output port OUT1. This relationship between the input ports and the output ports can be expressed to $(1, 2, 3) \rightarrow (2, 3, 1)$. Here, the procession element of the procession on the left-hand side of an arrow shall express the number of an input port, respectively, the procession element of the procession on the right-hand side of an arrow shall express the number of an output port, respectively, and an arrow shall mean that the procession elements in the same position correspond.

According to the first embodiment, not only $(1, 2, 3) \rightarrow (2, 3, 1)$ connection, but other various connection can be achieved such as: $(1, 2, 3) \rightarrow (1, 2, 3)$, $(1, 2, 3) \rightarrow (1, 3, 2)$, $(1, 2, 3) \rightarrow (2, 1, 3)$, $(1, 2, 3) \rightarrow (3, 1, 2)$, and $(1, 2, 3) \rightarrow (3, 2, 1)$.

Thus, according to the optical cross-connect apparatus of the first embodiment, all the signals input to the same input port can be outputted from the same output port.

Figure 3:
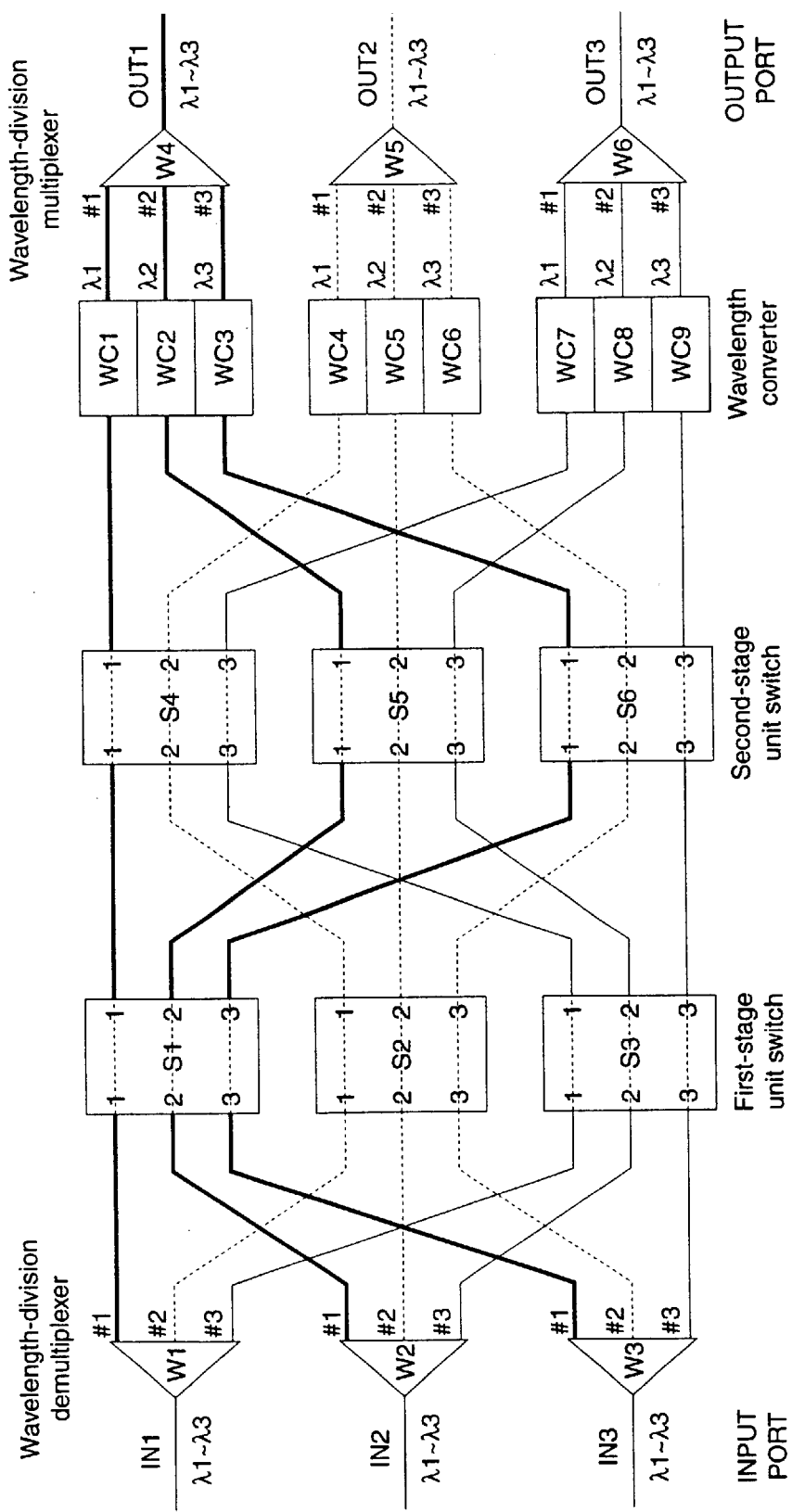
FIG. 3 shows another example for connection of each unit switch.

CASE B: The Optical Signals with the Same Wavelength at Each Input Port are Output from the Same Output Port FIG. 3 shows a connection of each first and second-stage unit switch inside of the optical cross-connect 1. Here, the bold lines show the course of each optical signal with wavelength $\lambda 1$. The dotted lines show the course of each optical signal with wavelength $\lambda 2$, and the normal lines show the course of each optical signal with wavelength $\lambda 3$. In FIG. 3, all the optical signals with wavelength $\lambda 1$ are output from the output port OUT1. Similarly, optical signals with wavelength $\lambda 2$ are output from the output port OUT2 and optical signals with wavelength $\lambda 3$ are output from the output port OUT3.

Such an output is achieved by switching the first-stage unit switches and the second-stage unit switches as follows. Namely, all the first and second-stage unit switch S1 to S6 connect their input #1 and output #1, their input #2 and output #2, and their input #3 and output #3. Connection between the wavelength division demultiplexer W1 to W3 and the first-stage unit switch S1 to S3 is the same as the connection shown in FIG. 1. In addition, connection between the first and second-stage unit switches is the same as the connection shown in FIG. 1, so detailed description is omitted.

In this case, for example, an optical signal output from the output #1 of the wavelength division demultiplexer W1 is led to the wavelength converter WC1. As a result, the wavelength converter WC1 outputs the optical signal without changing the wavelength thereof. While, for the other example, an optical signal output from the output #1 of the wavelength division demultiplexer W2 is led to the wavelength converter WC2. As a result, the wavelength converter WC2 changes the wavelength thereof into $\lambda 2$ and outputs.

Of course, the connection explained above is an example. In FIG. 3, to the each input #1 of each second-stage unit switch S4 to S6, optical signal with wavelength $\lambda 1$ is applied. By changing switch operation of the second-stage unit switch S4 to S6, the output port to which each wavelength is applied can be changed. Thus, all the signals with the same wavelength can be outputted from the same output port.

CASE C: Random Output

Figure 4:
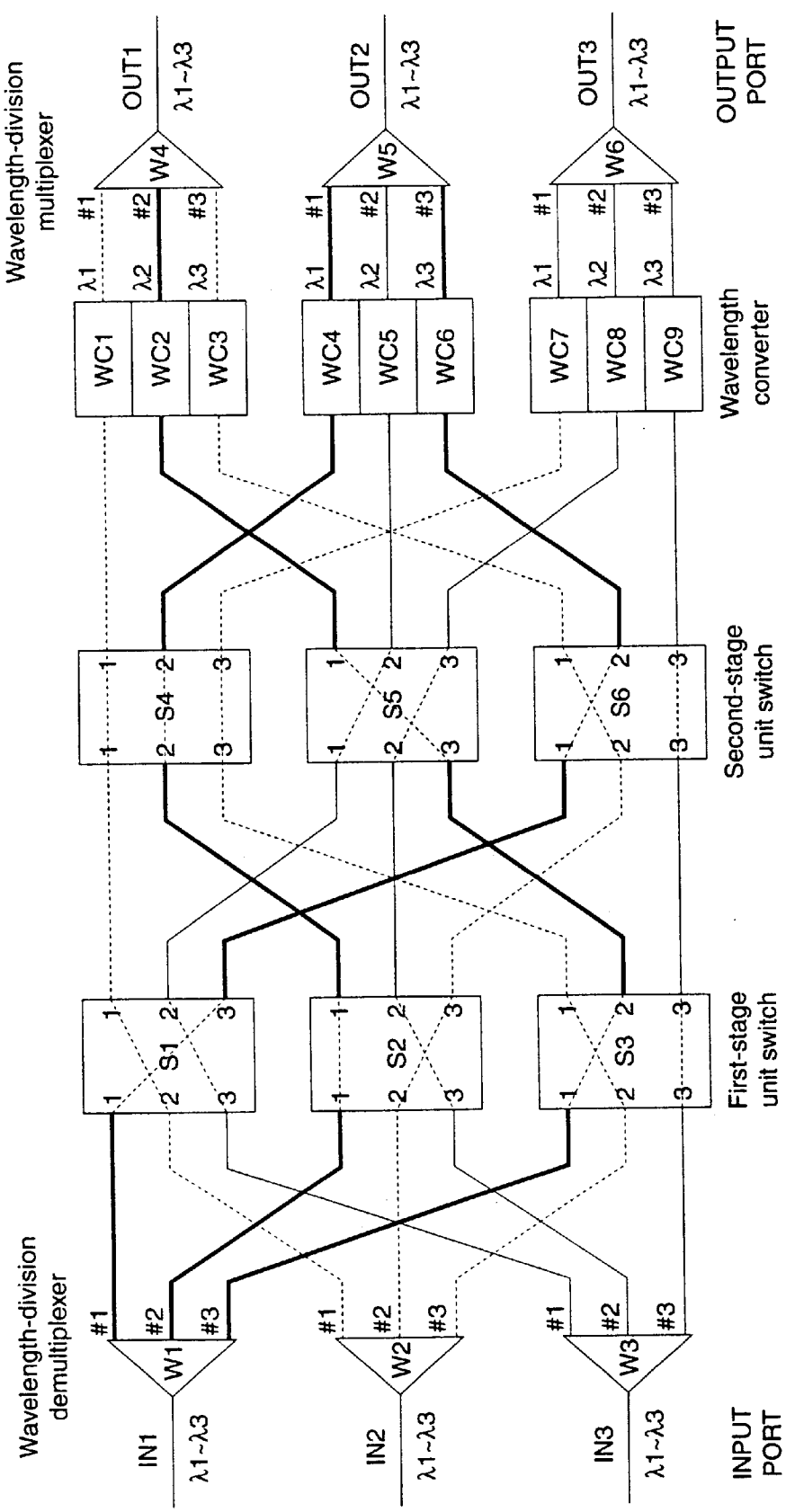
FIG. 4 shows another example for connection of each unit switch.

FIG. 4 shows a connection of each first and second-stage unit switch inside of the optical cross-connect 1. Here, the bold lines show the course of each optical signal inputted to the input port IN1. The dotted lines show the course of each optical signal inputted to the input port IN2. The normal lines show the course of each optical signal inputted to the input port IN3.

In FIG. 4, an optical signal to the input #1 of the wavelength division demultiplexer W1 is led to the input #3 of the wavelength division multiplexer W5. Similarly, an optical signal to the input #2 of the wavelength division demultiplexer W1 is led to the input #1 of the wavelength division multiplexer W5, and an optical signal to the input #3 of the wavelength division demultiplexer W1 is led to the input #2 of the wavelength division multiplexer W4.

Next, as to optical signals to the wavelength division demultiplexer W2, an optical signal to the input #1 of the wavelength division demultiplexer W2 is led to the input #1 of the wavelength division multiplexer W4, an optical signal to the input #2 of the wavelength division demultiplexer W2 is led to the input #3 of the wavelength division multiplexer W4, and an optical signal to the input #3 of the wavelength division demultiplexer W2 is led to the input #1 of the wavelength division multiplexer W6.

Further, as to optical signals to the wavelength division demultiplexer W3, an optical signal to the input #1 of the wavelength division demultiplexer W3 is led to the input #2 of the wavelength division multiplexer W5, an optical signal to the input #2 of the wavelength division demultiplexer W3 is led to the input #2 of the wavelength division multiplexer W6, and an optical signal to the input #3 of the wavelength division demultiplexer W3 is led to the input #3 of the wavelength division multiplexer W6.

Such an output is achieved by switching the first-stage unit switches and the second-stage unit switches as follows. Namely, input #1 and output #3, input #2 and output #1, and input #3 and output #2 of the first-stage unit switch S1 should be connected. Similarly, input #1 and output #1, input #2 and output #3, and input #3 and output #1 of the first-stage unit switch S2 should be connected. Further, input #1 and output #2, input #2 and output #1, and input #3 and output #3 of the first-stage unit switch S3 should be connected. Next, input #1 and output #1, input #2 and output #2, and input #3 and output #3 of the second-stage unit switch S4 should be connected. Similarly, input #1 and output #2, input #2 and output #3, and input #3 and output #1 of the second-stage unit switch S5 should be connected. Finally, input #1 and output #2, input #2 and output #1, and input #3 and output #3 of the second-stage unit switch S6 should be connected.

Of course, the connection explained above is an example. Thus, all the signals input to the same input port can be outputted from the same output port at random.

In above cases, the first-stage unit switches S1 to S3 function as a means to determine the wavelength of the output optical signal, while the second-stage unit switch S4 to S6 function as a means to determine the output ports for each optical signal.

This is because each of the second-stage unit switches S4 to S6 correspond to wavelength after wavelength conversion, while each of the first-stage unit switch S1 to S3 distribute inputted optical signal to each second-stage unit switch. Therefore, in the case of the above-mentioned examples, optical signals of the same wavelength at each input port IN1 to IN3 will surely be converted to optical signals of three different wavelengths $\lambda 1$, $\lambda 2$, and $\lambda 3$. If this is said conversely, it means that optical signals of the same wavelength at each input port cannot be outputted on the same wavelength. For example, the optical signals of $\lambda 1$ cannot be outputted as optical signals of $\lambda 1$.

In these cases, however, if an administrator of a network manages the operating wavelength between each node (cross-connect apparatus or Add/Drop apparatus), there is no need to output the inputted optical signals on the same wavelength.

(B) The Optical Wavelength Multiplexed Signal with Some Wavelength Vacant are Applied Generally, it is the rare case that all lines on the network are in operation. It is because there are several vacant lines prepared in the network, for foreseeing restoration at the time of the network failure, or extension of network in the future. The network administrator, for example, manages to assign traffics into optical signals of $\lambda 1$ and $\lambda 2$, and the network administrator assigns no traffic to optical signal of $\lambda 3$. In this situation, the optical signal of $\lambda 3$ is currently "vacant". As a result, connections on which the optical signal $\lambda 3$ should travel are also "vacant". However, for example, if the network administrator assigns new traffic to optical signal of $\lambda 3$, the optical signal of $\lambda 3$ and the connections on which the optical signal of $\lambda 3$ should change to "operation state" from "vacant". Now, the switching operation for changing those vacant lines into an operation state will be explained, using FIGS. 5 to 7. Here, the real lines show the lines in operation, while the dotted lines show the course for the vacant lines.

CASE D: Optical Signals of the Same Wavelength at the Each Port are Vacant

Figure 5:
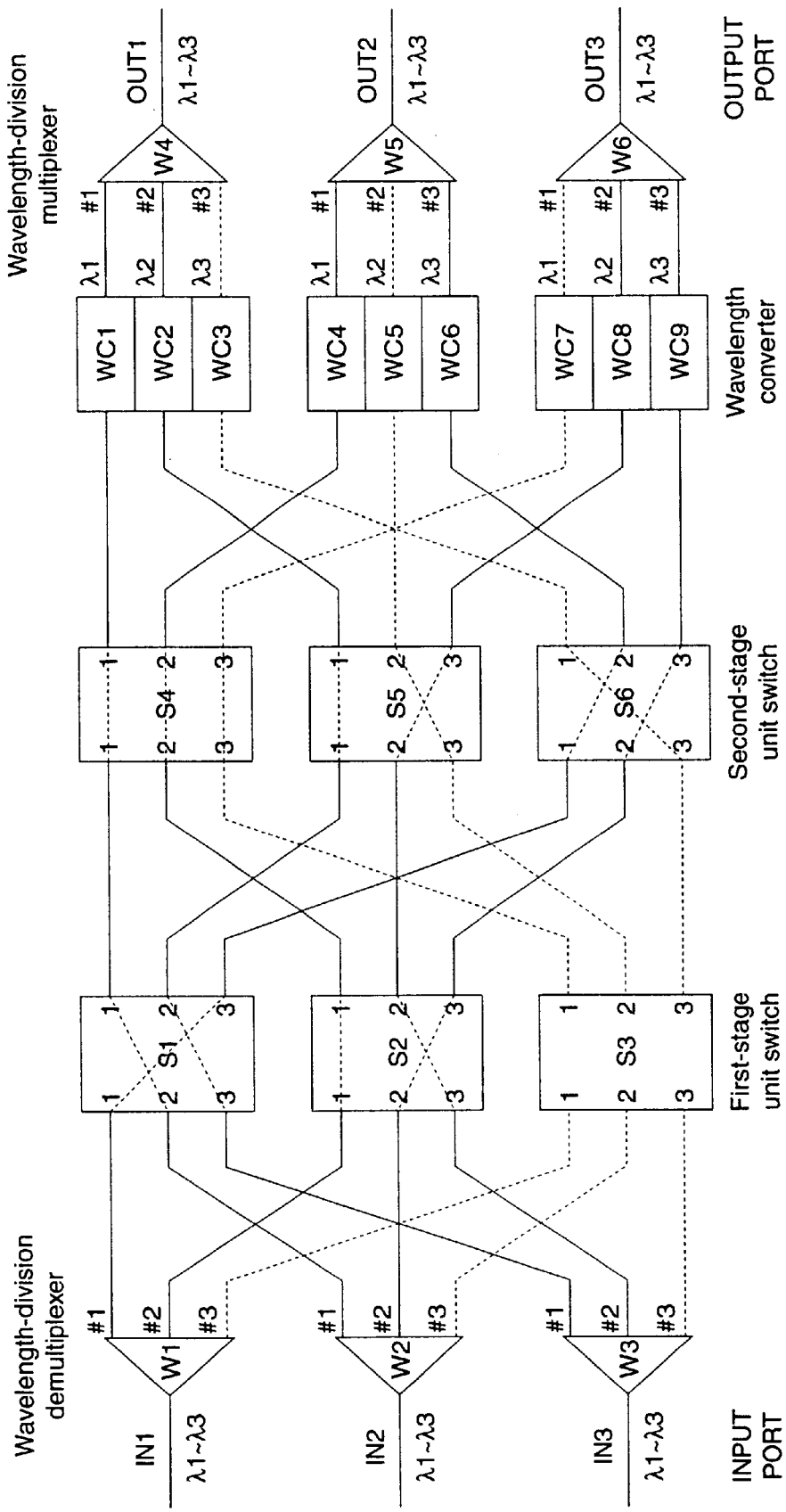
FIG. 5 shows another example for connection of each unit switch.

FIG. 5 shows a connection when optical signals of wavelength $\lambda 3$ at each input port are vacant. In this situation, at each output port, corresponding output shall also be vacant. For example, in FIG. 5, the optical signal of wavelength $\lambda 3$ of the output port OUT1, the optical signal of wavelength $\lambda 2$ of the output port OUT2, and the optical signal of wavelength $\lambda 1$ of the output port OUT3 are vacant, respectively.

In this case, all lines connected to the first-stage unit switch S3 are vacant. In other words, all lines which are in "operation state" are not connected to the first-stage unit switch S3. Thus, when the network administrator assigns new traffic to optical signal of $\lambda 3$, only the first-stage unit switch S3 should be switched. Namely, the switching operation of the first-stage unit switch S3 does not influence the other unit switches. As a result, there is no possibility of interruption on the existing connection in the optical cross-connect 1.

CASE E: The Vacant Wavelength is Different at Each Input Port

Figure 6:
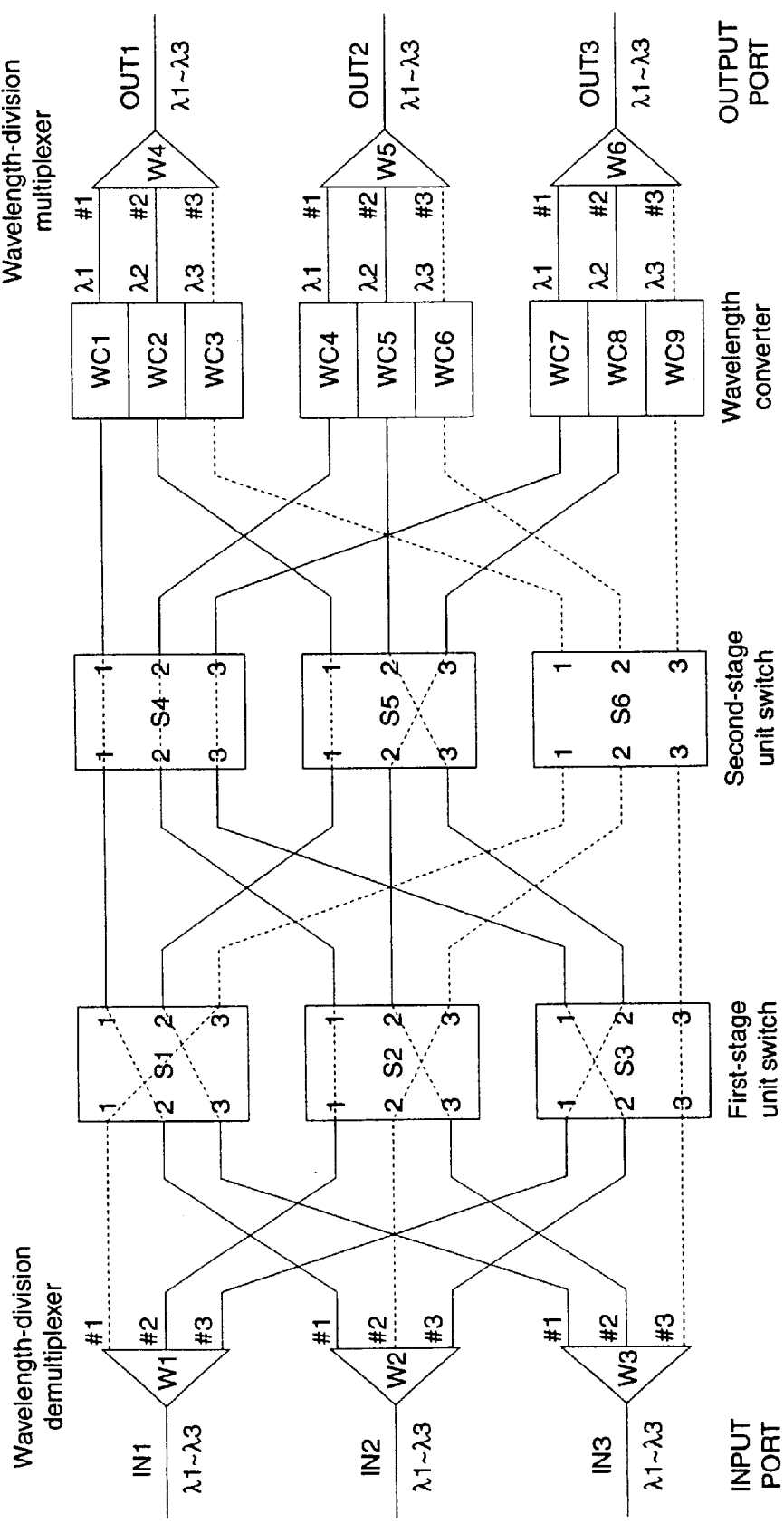
FIG. 6 shows another example for connection of each unit switch.

FIG. 6 shows a connection when the vacant wavelength is different at each input port. For example, in FIG. 6, the optical signal of wavelength $\lambda 1$ of the input port IN1, the optical signal of wavelength $\lambda 2$ of the input port IN2, and the optical signal of wavelength $\lambda 3$ of the input port IN3 are vacant, respectively. As a result, the optical signal of wavelength $\lambda 3$ of the output port OUT1, the optical signal of wavelength $\lambda 3$ of the output port OUT2, and the optical signal of wavelength $\lambda 3$ of the output port OUT3 are vacant, respectively.

In this case, all lines connected to the second-stage unit switch S6 are vacant. Thus, when the network administrator assigns new traffic to any of the vacant signals, only the second-stage unit switch S6 should be switched.

Figure 7:
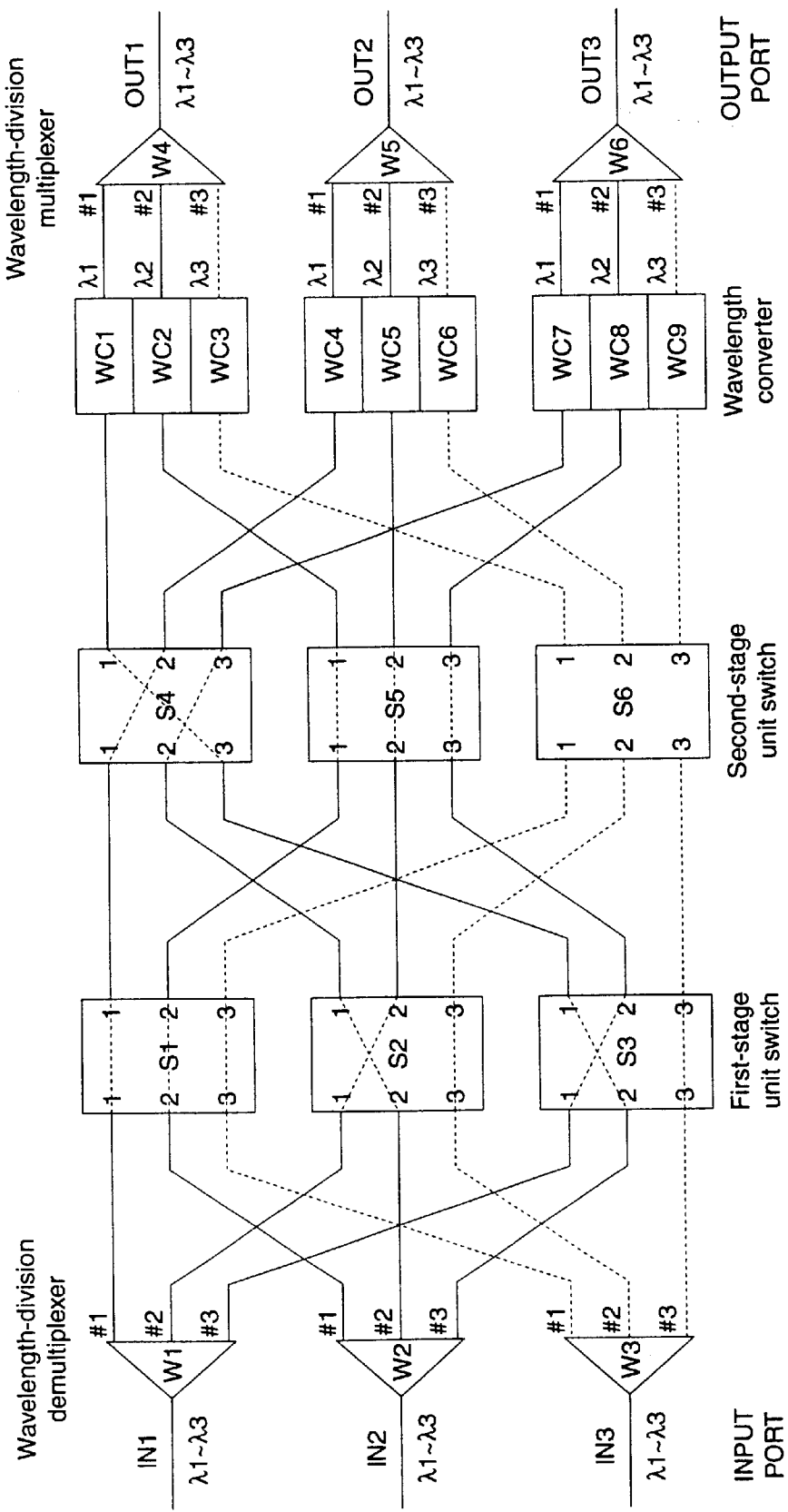
FIG. 7 shows another example for connection of each unit switch.

CASE F: All Optical Signals Which are Inputted to the Same Input Port are Vacant FIG. 7 shows a connection when all optical signals which are inputted to the same input port are vacant. In FIG. 7, no optical signal is inputted to the input port IN3. As a result, the optical signal of wavelength λ3 of the output port OUT1, the optical signal of wavelength λ3 of the output port OUT2, and the optical signal of wavelength λ3 of the output port OUT3 are vacant, respectively.

In this case, also, all lines connected to the second-stage unit switch S6 are vacant. Thus, when the network administrator assigns new traffic to any of the vacant signals, only the second-stage unit switch S6 should be switched.

Figure 8:
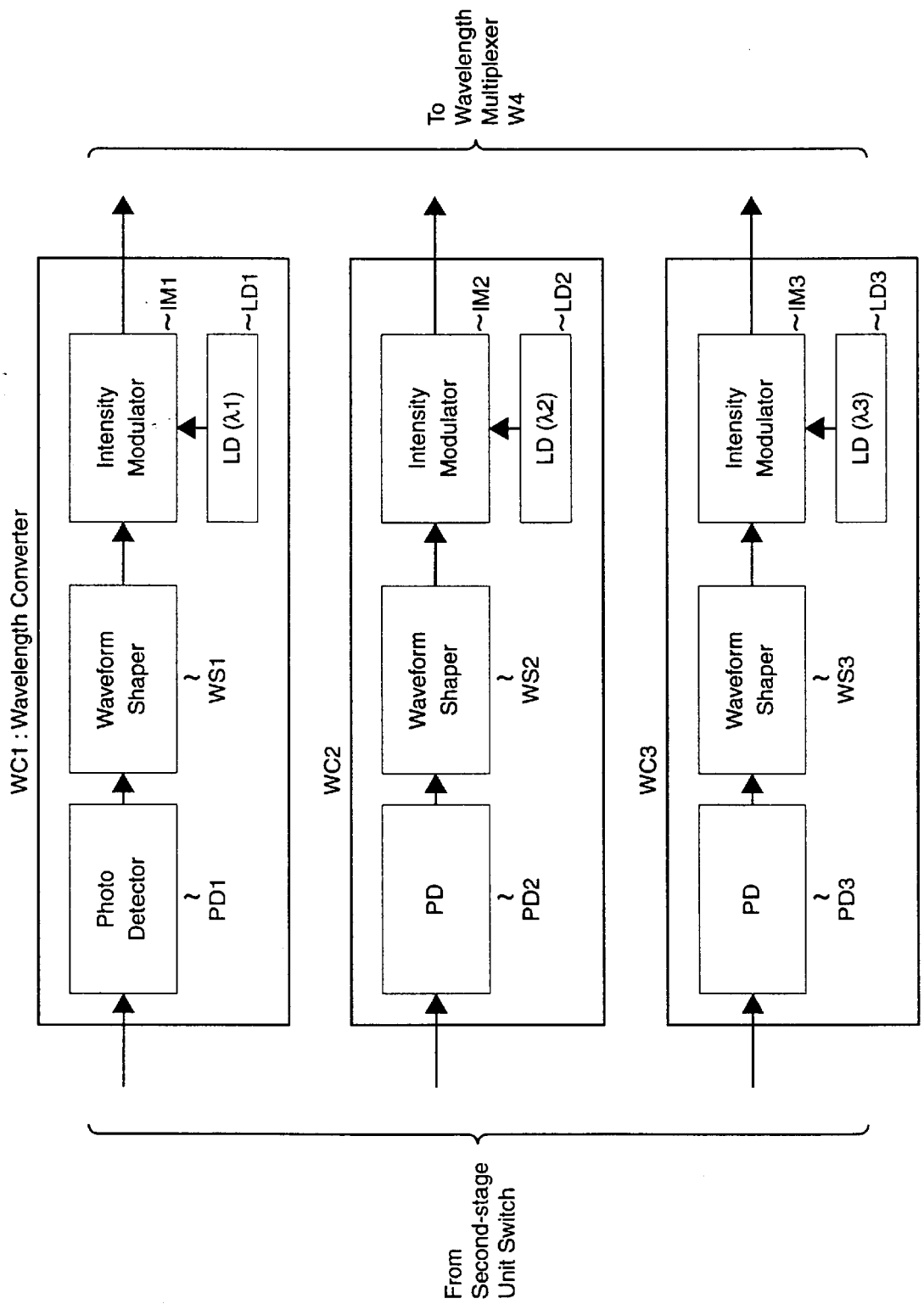
FIG. 8 shows an example of the wavelength converter.

Hereinafter, a detailed block diagram of the wavelength converter WC will be explained. First, one example of the wavelength converter is shown in FIG. 8. Although only the wavelength converters WC1 to WC3 are shown in FIG. 8, the other wavelength converters WC4 to WC9 have the same configuration.

The wavelength converter WC1 has a photo-detector PD1. The photo-detector PD1 receives the optical signal from the second-stage unit switch S4, and converts the optical signal into an electric signal. The converted electric signal is then applied to a waveform shaper WS1. The waveform shaper WS1 performs steps called 3R, i.e., re-timing, re-shaping and regenerating, of the converted electric signal. The photo-detector PD1 and the waveform shaper WS1 constitute a section called O/E.

The electric signal is next applied to an intensity modulator IM1. To the intensity modulator IM1, a laser diode LD1 is connected. The LD1 outputs a continuous wave of λ1 to the intensity modulator IM1. The intensity modulator IM1 modulates the continuous wave by the electric signal. The intensity modulator IM1 and the laser diode LD1 constitute a section called E/O.

Thus, the output of the intensity modulator IM1 is applied to the wavelength multiplexer W4. The other wavelength converters WC2 and WC3 have a similar configuration. However, the wavelength converter WC2 has a laser diode LD2 which outputs a continuous wave of λ2, and the wavelength converter WC3 has a laser diode LD3 which outputs a continuous wave of λ3.

Figure 9:
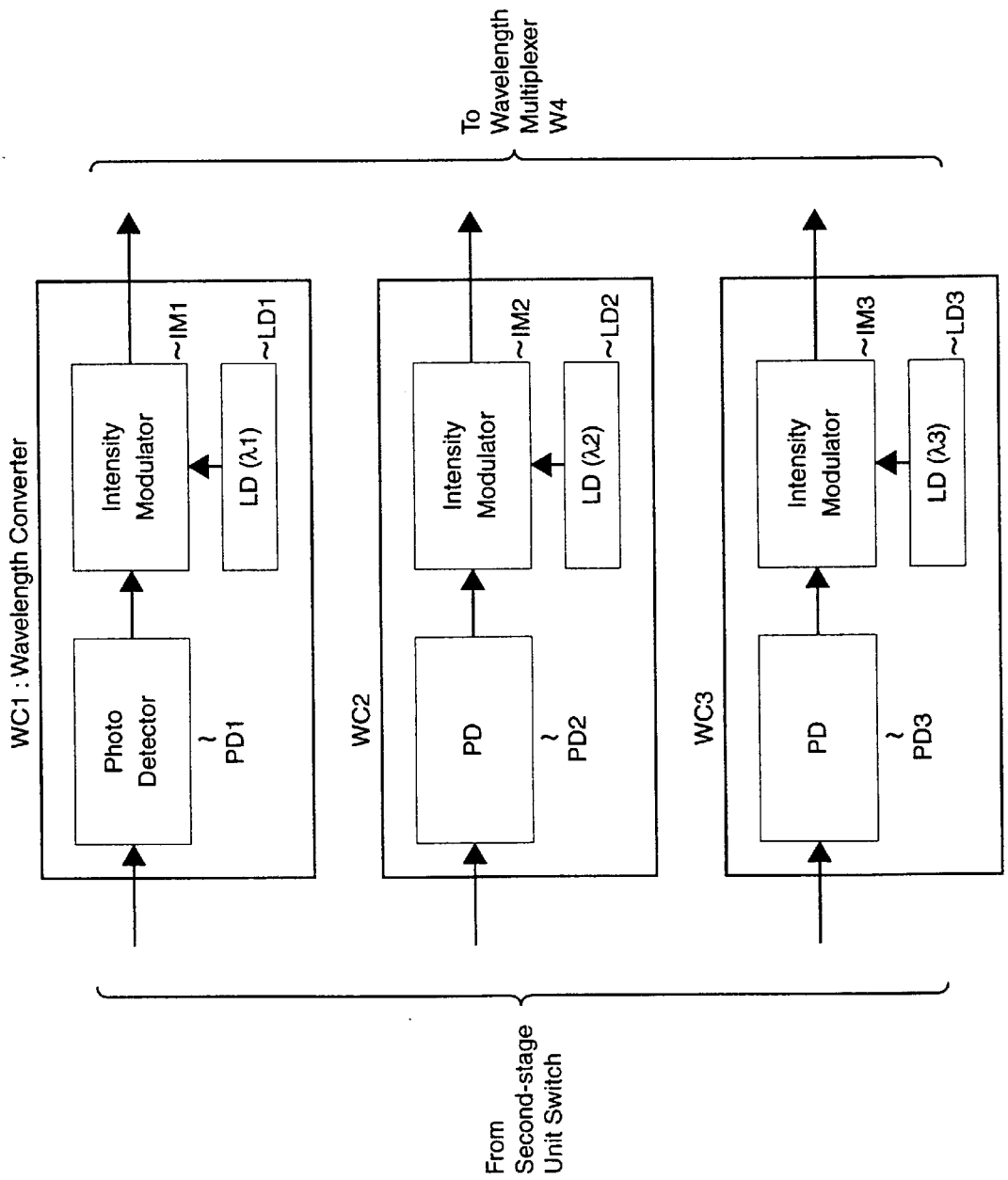
FIG. 9 shows another example of the wavelength converter.

FIG. 9 shows another example of the wavelength converter WC1. The photo-detector PD1 receives the optical signal from the second-stage unit switch S4, and converts the optical signal into an electric signal. The electric signal is next applied to an intensity modulator IM1. To the intensity modulator IM1, a laser diode LD1 is connected. The LD1 outputs a continuous wave of a λ1 to the intensity modulator IM1. The intensity modulator IM1 modulates the continuous wave by the electric signal. The intensity modulator IM1 and the laser diode LD1 constitute an E/O section.

Thus, output of the intensity modulator IM1 is applied to the wavelength multiplexer W4. The other wavelength converters WC2 and WC3 have a similar configuration. However, the wavelength converter WC2 has a laser diode LD2 which outputs a continuous wave of λ2, and the wavelength converter WC3 has a laser diode LD3 which outputs a continuous wave of λ3.

Figure 10:
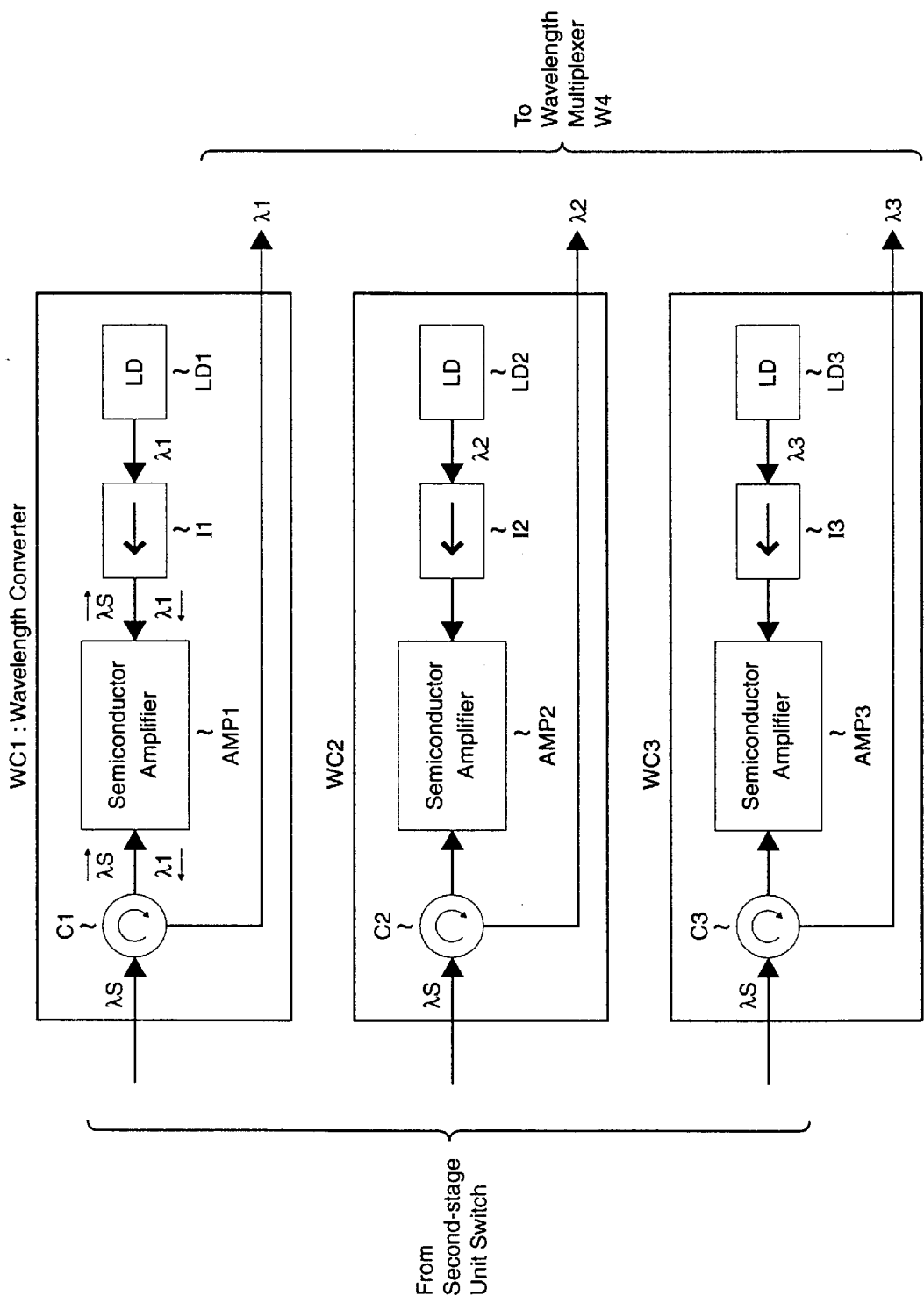
FIG. 10 shows another example of the wavelength converter.

Next, FIG. 10 shows still another example of the wavelength converter WC1. The wavelength converter WC1 has an semiconductor amplifier AMP1. The semiconductor amplifier AMP1 receives the optical signal from the second-stage unit switch S4, via a circulator C1. To the semiconductor amplifier AMP1, a laser diode LD1 is connected via an isolator I1. The LD1 outputs a continuous wave of λ1 to the semiconductor amplifier AMP1. By the continuous wave of λ1, the semiconductor amplifier AMP1 is saturated.

Here, assume that the wavelength of the input signal as λs, the optical signal of λs is applied to the semiconductor amplifier AMP1. In such situation, when the signal of λs is at "1 (high)" state, the power of the signal of λ1 decreases because the total power of these two signals should be the same. As a result, the waveform of the signal of λ1 becomes inverse. The signal of λs and the signal of λ1 then respectively outputted from the semiconductor amplifier AMP1. The signal of λs is applied to the isolator Ii and is terminated, while the signal of λ1 is applied to the circulator C1 and outputted from the wavelength converter WC1. The outputted signal of λ1 should be again inverse at the transmitting side or at the receiving side.

The wavelength converter shown in FIG. 10 can generate the output signal even when the λs is λ1, since the directions of the two optical signals are opposite each other. The wavelength converters WC2 and WC3 have the same configuration, except the wavelengths of the laser diode LD are λ2 and λ3, respectively.

Figure 11:
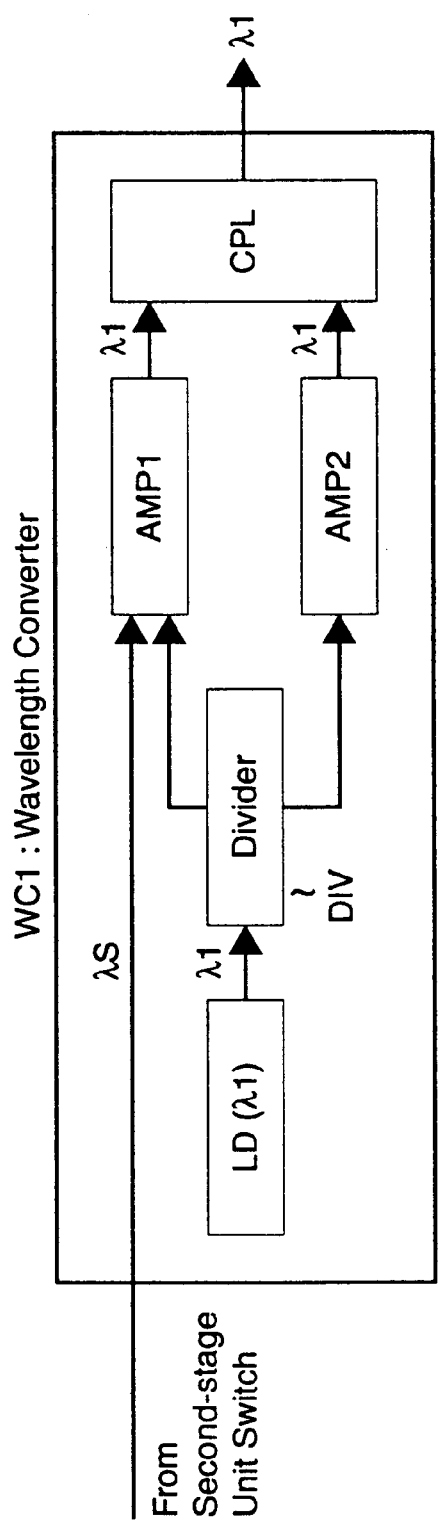
FIG. 11 shows another example of the wavelength converter.

FIG. 11 shows still another configuration of the wavelength converter WC1. In the wavelength converter shown in FIG. 11, cross phase modulation is used for wavelength conversion. The wavelength converter WC1 shown in FIG. 11 has a laser diode LD1, which outputs an optical continuous wave of λ1. The wavelength converter WC1 further has two semiconductor amplifiers AMP1 and AMP2. The input optical signal of λs from the second-stage unit switch is applied to the AMP1. While, the continuous wave of λ1 is applied to both of the semiconductor amplifiers AMP1 and AMP2, via a divider DIV. As a result, to the AMP1, two signals are applied, while to the AMP2, only the continuous wave is applied.

In this situation, cross phase modulation occurs at the AMP1, and thus the AMP1 outputs an optical signal, which has the same wavelength as the input optical signal and wavelength of λ1. At this time, phase-shift occurs on the output from the AMP1. This output from the AMP1 is applied to a coupler CPL while the output from the AMP2 is also applied to the coupler CPL, with no phase-shift. At the coupler CPL, the two optical signals are coupled. As a result, interference occurs between the two optical signals and the intensity of the output from the AMP1 varies.

In FIG. 11, although the wavelength converter WC1 has AMP1 and AMP2, the AMP2 is not necessarily needed. Nevertheless the AMP2 is effective for providing uniform intensity of each output from the AMP1 and AMP2. In addition, when AMP2 is omitted, operation for adjusting timing between two inputs to the coupler CPL should be needed.

As explained above, the optical cross-connect apparatus can distribute inputted optical signals to desired output ports. Moreover, loss of optical signal becomes smaller because the number of unit switches has been reduced. This achieves reduction of hardware quantity. Further, it becomes easier to produce larger-scale optical cross-connect apparatus. For example, if 16 of 8×8 unit switches are used, a total switch scale of 64×64 is realizable. At this time, the number of input/output optical fibers becomes 8, and the number of optical multiplexing on each input/output optical fiber is also 8.

Figure 12:
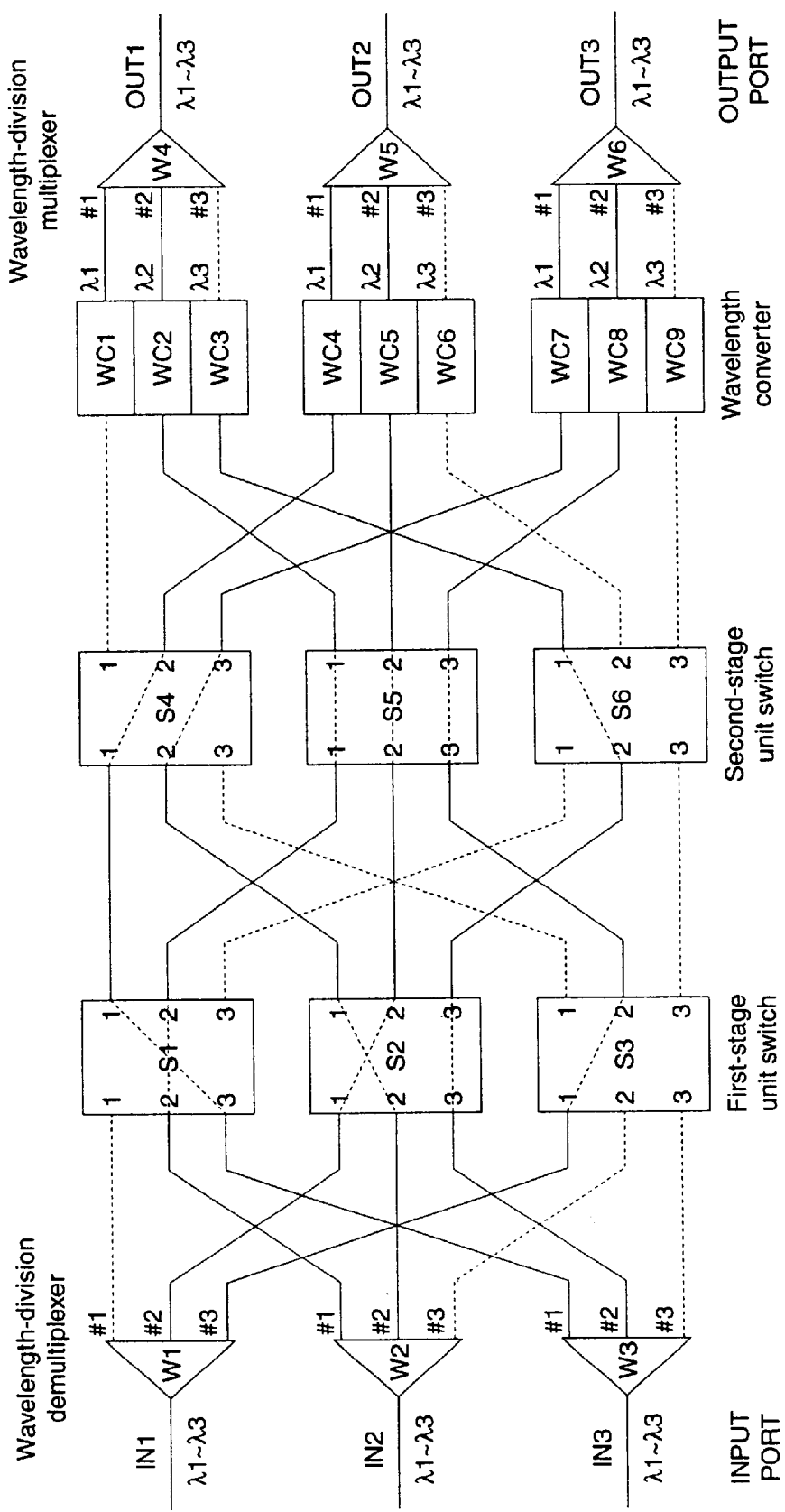
FIG. 12 shows a situation wherein the vacant lines are divided randomly.

If the vacant lines are divided randomly, for example as shown in FIG. 12, a bottleneck may occur. In FIG. 12, an optical signal of λ1 to the input port IN1, and optical signals of λ3 to the input ports IN2 and IN3 are vacant. In such situation, the bottleneck, in other words a state in which it becomes impossible that a vacant output port is taken out to, may occur.

Such state where a vacant line is assigned randomly will not occur when, as shown in FIG. 5, all of the optical signals on the vacant lines are converted to different wavelengths.

However, when some of the optical signals on the vacant lines are converted to the same wavelengths, such state may occur. Even in this case, such bottleneck can be dissolved by re-switching all the lines. However in this case, if the wavelength of the output signal is made variable, such bottleneck can be easily canceled, because the wavelength from the output port can be selected from several wavelengths. Hereinafter, the case where the optical cross-connect apparatus has such a wavelength variable mechanism is explained.

Figure 13:
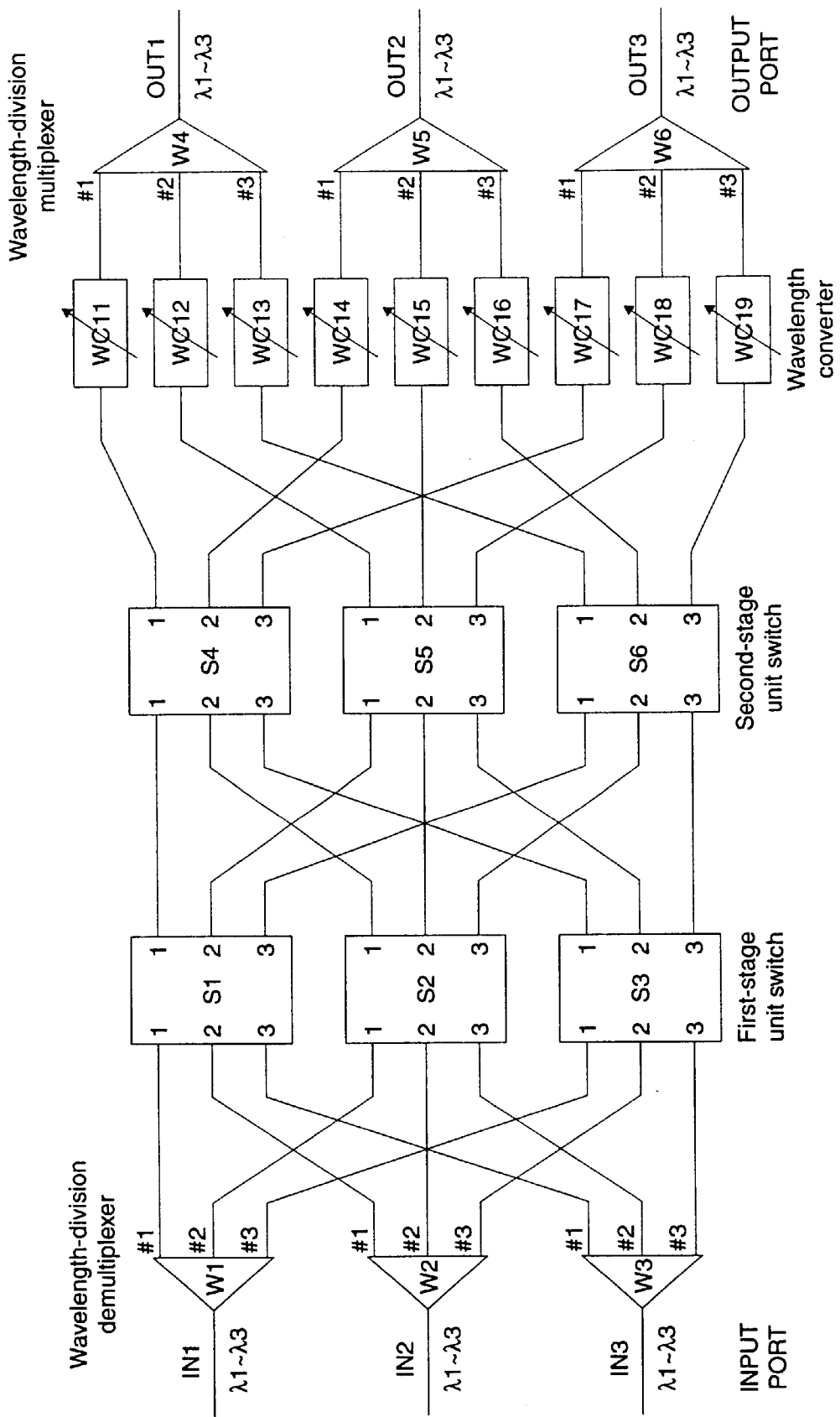
FIG. 13 is a functional block diagram with wavelength converter outputs of variable wavelength.

FIG. 13 shows a block diagram of such optical cross-connect apparatus. In FIG. 13, wavelength converters WC1 to WC19 are disposed instead of the wavelength converters WC1 to WC9 in FIG. 1. The wavelength converters WC11 to WC19 output optical signals with variable wavelengths. To realize such variable wavelength converters, replacing the laser diode in the wavelength converters WC1 to WC9 with variable wavelength light sources is the simplest.

Next, the example of a change operation of the optical crossing connection equipment concerning the 2nd enforcement form is explained using a drawing.

Here, the contents are explained using FIG. 10.

Figure 14:
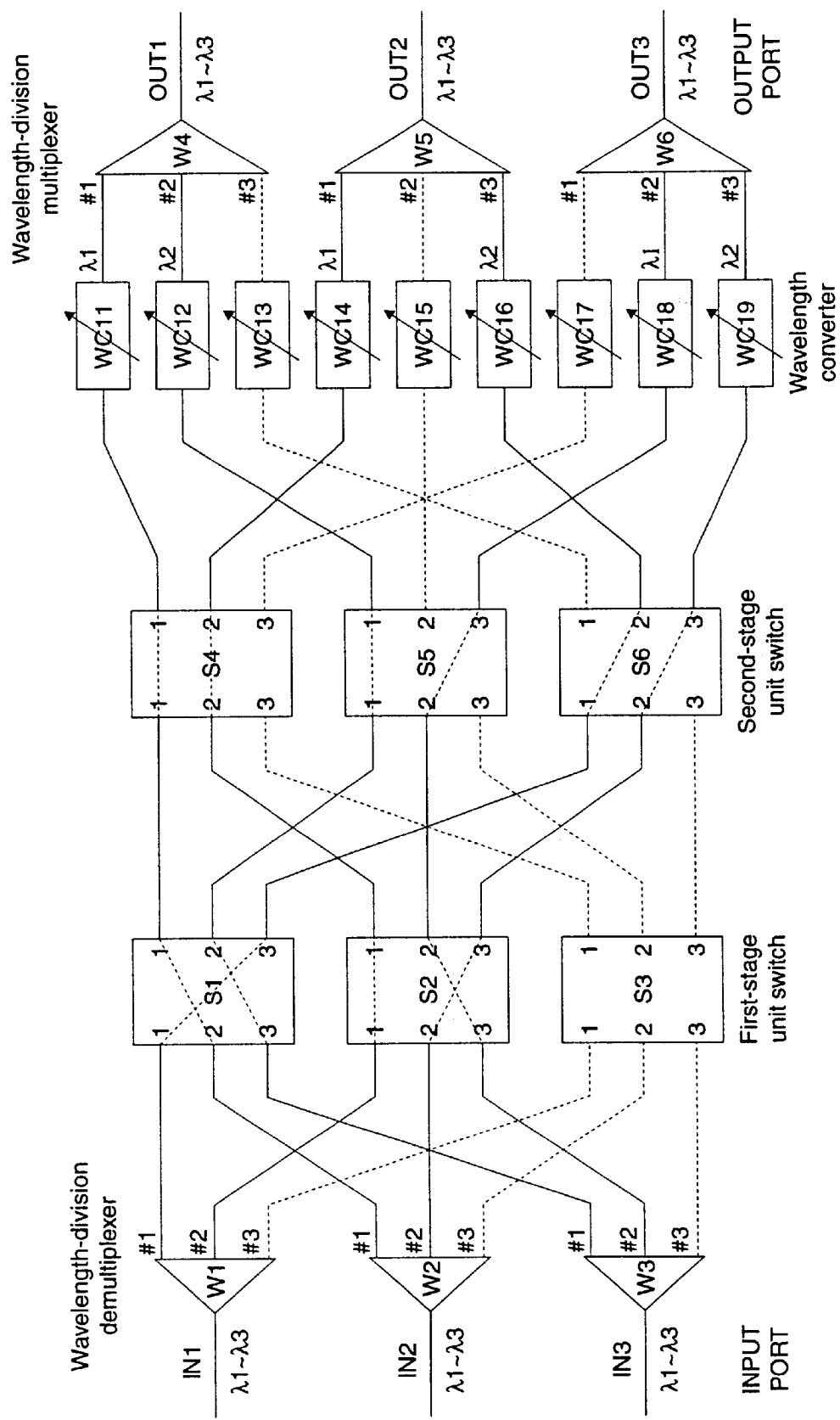
FIG. 14 shows an example for connection of the unit switch in the configuration shown in FIG. 13.

FIG. 14 shows a connection of each first and second-stage unit switch inside of the optical cross-connect 1. First, the case where the wavelength converters WC3, WC5, and WC7 are vacant, like the example shown in FIG. 5, will be considered. In this case, the optical cross-connect apparatus 1 of the embodiment sets up as follows the wavelengths of the output signals.

For example, as shown in FIG. 14, the optical cross-connect apparatus 1 sets wavelength as follows:

the wavelength from the wavelength converter WC11 to $\lambda 1$;

the wavelength from the wavelength converter WC12 to $\lambda 2$;

the wavelength from the wavelength converter WC14 to $\lambda 1$;

the wavelength from the wavelength converter WC16 to $\lambda 2$;

the wavelength from the wavelength converter WC18 to $\lambda 1$, and;

the wavelength from the wavelength converter WC19 to $\lambda 2$.

By this setup, all vacant lines can be assigned to wavelength of $\lambda 3$. According to the configuration shown in FIG. 13, since the output wavelengths of each wavelength converter is variable, blocking can be prevented and the bottleneck may not occur when the vacant lines change to "operation state" from "vacant".

As stated above, AWG (Arrayed Waveguide Grating) or FBG (Fiber Bragg Grating) can be used for the wavelength division multiplexers. For example, in the case that the output wavelength of each wavelength converter is fixed, the loss at the time of optical multiplex can be reduced by using AWG. Moreover, in the case that the output wavelength of each wavelength converter is variable, it is difficult to use AWG for the wavelength division multiplexer. Therefore an optical coupler should be used. By using optical couplers, although the loss at the time of optical multiplex will become larger compared with AWG, it can accept any wavelength.

In an above-mentioned embodiment, the case where this invention is applied to optical cross-connect apparatus is described. However, this invention can apply to the other switching equipments. Moreover, the present invention can handle not only optical signals, but other type of signals, for example electric signals and frequency division multiplexed signals.

For example, when frequency division multiplexed signals are applied, the wavelength demultiplexers W1 to W3 and the wavelength multiplexers W4 to W6 should be replaced with frequency division demultiplexers and frequency division multiplexers, respectively. In addition, the unit switches should be replaced with electronic switches. Furthermore, the wavelength converters should be replaced with frequency converters. Such frequency converters contains an oscillator which generates a desired frequency for the frequency converter.

For example, if the frequency converter outputs a signal of frequency f1, the frequency converter should have an oscillator of f1. Further, when the frequency of the input signal is f1, namely the same frequency to the oscillator, the inputted signal can be outputted without frequency conversion. Off course, 2R or 3R operation to the inputted signal is preferred.

On the other hand, when the frequency of the input signal is not f1, namely different than the frequency to the oscillator, the frequency of the inputted signal should be converted. For example, assume that the frequency converter should output the signal of frequency f2, and the frequency of the inputted signal is f1. In this case, the frequency converter has an oscillator of f2. Further, the frequency converter has a detector which generates an envelope signal of the inputted signal. Next, the output of the oscillator is modulated by the detected envelope signal. Thus, the frequency converter outputs a signal of frequency f2.

What is claimed is:

1. An optical cross-connect apparatus for accepting a wavelength-division M-multiplexed optical signal, where M is an integer, comprising:

N input ports and N outputs ports, each of the input ports accepting and each of the outputs ports outputting the M-multiplexed optical signal, where N is an integer;

N optical demultiplexers connected to the N input ports respectively, each of the N optical demultiplexers demultiplexing the inputted M-multiplexed optical signal into M optical signals;

an optical switch matrix of MN×MN, connected to the N optical demultiplexers, for switching the M optical signals, the optical switch matrix including a plurality of N×M unit switches, the N×M unit switches being arranged in a first stage and a second stage with outputs of the unit switches in the first stage being connected to inputs of the unit switches in the second stage;

MN wavelength converters respectively connected to the optical switch matrix, for converting wavelengths of the optical signals into predetermined wavelengths; and N optical multiplexers respectively connected to the wavelength converters, for multiplexing the optical signals and for applying the multiplexed optical signal to the N output ports.

2. An optical cross-connect apparatus according to claim 1, wherein the output wavelengths of the wavelength converters are variable.

3. An optical cross-connect apparatus for accepting a wavelength-division M-multiplexed optical signal, where M is an integer, comprising:

N input ports and N outputs ports, each of the input ports accepting and each of the outputs ports outputting the M-multiplexed optical signal, where;

optical demultiplexer means connected to the N input ports, for demultiplexing the inputted M-multiplexed optical signal into M optical signals;

an optical switch matrix of MN×MN, connected to the N optical demultiplexers, for switching the M optical signals, the optical switch matrix including a plurality of N×M unit switches, the N×M unit switches being arranged in a first stage and a second stage, outputs of the unit switches in the first stage being connected to inputs of the unit switches in the second stage;

wavelength conversion means connected to the optical switch matrix, for converting wavelengths of the optical signals into predetermined wavelengths; and optical multiplexers means connected to the wavelength conversion means, for multiplexing the optical signals and for applying the multiplexed optical signal to the N output ports.

4. An optical cross-connected apparatus according to claim 3, wherein the output wavelengths of the wavelength converters are variable.

5. A switching apparatus for accepting a frequency-division M-multiplexed optical signal, where M ia an integer, comprising:

N inputs ports and N output ports, each of the input ports accepting and each of the output ports outputting the M-multiplexed signal, where Nis an integer;

demultiplexer means connected to the N input ports, for demultiplexing the inputted M-multiplexed signal into M signals;

a switch matrix of MN×MN, connected to the demultiplexer means, for switching the M signals, the optical switch matrix being constructed by a plurality of N×M size unit switches, the N×M size unit switches being arranged in a first stage and a second stage, outputs of the unit switches in the first stage being connected to inputs of the unit switches in the second stage;

frequency conversion means connected to the switch matrix, for converting frequencies of the signals into predetermined frequencies; and multiplexer means connected to the frequency conversion means, for multiplexing the signals and for applying the multiplexed signal to the N output ports.

6. An optical cross-connect apparatus according to claim 5, wherein the output frequency of the frequency converters are variable.

* * * * *